United States Patent
Loftus et al.

(10) Patent No.: US 12,113,638 B2
(45) Date of Patent: Oct. 8, 2024

(54) CONFERENCE RECORDING OPT-OUT NOTIFICATION AND MANAGEMENT

(71) Applicant: Avaya Management L.P., Durham, NC (US)

(72) Inventors: Liam Loftus, Galway (IE); Frank McGuire, Galway (IE)

(73) Assignee: Avaya Management L.P., Durham, NC (US)

( * ) Notice: Subject to any disclaimer, the term of this patent is extended or adjusted under 35 U.S.C. 154(b) by 92 days.

(21) Appl. No.: 17/703,177

(22) Filed: Mar. 24, 2022

(65) Prior Publication Data

US 2023/0308304 A1   Sep. 28, 2023

(51) Int. Cl.
*G10L 13/02* (2013.01)
*H04L 12/18* (2006.01)

(52) U.S. Cl.
CPC .......... *H04L 12/1831* (2013.01); *G10L 13/02* (2013.01); *H04L 12/1822* (2013.01); *H04L 12/1827* (2013.01)

(58) Field of Classification Search
CPC ............................. G10L 13/02; H04L 12/1831
USPC ......................................................... 709/204
See application file for complete search history.

(56) References Cited

U.S. PATENT DOCUMENTS

| 7,881,235 B1* | 2/2011 | Arthur ................ H04L 12/1818 709/227 |
| 2011/0271192 A1* | 11/2011 | Jones .................... G06F 3/0421 709/227 |

\* cited by examiner

*Primary Examiner* — Sibte H Bukhari
(74) *Attorney, Agent, or Firm* — Sheridan Ross P.C.

(57) ABSTRACT

When less than all participants of a remote conference consent to being recording, meeting minutes may need to be manually recorded as text for those non-consenting participants to ensure a complete record of the meeting. By signaling a minutes taker via their input device that a current speaker is a non-consenting speaker, the input device may enable or emphasize a textual input component and/or indicia of the current speaker. As a result, a conference server may receive textual content in place of speech for non-consenting participants and record the conference that is complete but omits speech provided by non-consenting participants.

18 Claims, 4 Drawing Sheets

CONFERENCE RECORDING OPT-OUT NOTIFICATION AND MANAGEMENT

FIELD OF THE DISCLOSURE

The invention relates generally to systems and methods for recording a remote conference and particularly to obtaining meeting minutes from participants not consenting to recording.

BACKGROUND

Within a multiparty audio conference, a participant may opt-out of allowing their contributions to the audio of the call to be recorded. Prior art systems allow parties who opt-in to recording and have their audio recorded while muting or obfuscating the parties that opt-out (or do not opt-in). Calls often comprise known patterns used for transcribing the call from recordings, including technology to summarize the call from such transcriptions.

SUMMARY

Prior art approaches to conference minute taking fails to notify the chairperson or minutes-taker of the meeting that the automated recording/minutes will be incomplete and exclude contributions of those participants that have not provided recording consent. Existing systems will either use full call recordings to generate minutes of the meeting or rely on a manual system of hand-recorded minutes. Often resulting in complete meeting minutes.

Meeting organizers may opt to record the meeting and use tools such as Avaya Conversational Intelligence to transcribe/generate meeting minutes. However, where a particular user participant is obfuscated/not recorded due to not consenting to being recorded, the meeting chair or delegate will need to manually create meeting minutes.

Technology to generate meeting minutes live or from recordings exist but fails to accommodate conferences that comprise participants that have both consented and not consented to recording.

These and other needs are addressed by the various embodiments and configurations of the present invention. The present invention can provide a number of advantages depending on the particular configuration. These and other advantages will be apparent from the disclosure of the invention(s) contained herein.

A conference chairpersons or other minute-taker may be challenged to record accurate meeting minutes where one or more participants to a conference has opted-out of recording. In these cases, the minute-taker will need to be alerted to the parties opting out in order to manually capture minutes.

In one embodiment, a system prompts the minute taker of the meeting capture meeting minutes only for those participants opting out and merge with an automatically generated summation from those participants opting in to recording.

In one embodiment, while recordings are automatically captured for consenting participants, and the chair or other delegate is prompted to capture minutes for those participants who have not consented. This has the distinct advantage of being able to generate minutes automatically from consenting parties and prompt the chair to record just the minutes of users that have not provided their recording consent. Such as system can greatly simplify the minute capture operation with minimal human intervention and remain compliant to emerging privacy regulations.

In another embodiment, a conference client system is provided which provides minute taking capabilities for a designated minute taker. The client prompts the minute taker to capture meeting minutes but only from participant(s) who have opted out of allowing recording of their participation. The system automatically records and/or transcribes the conference portion from those participants who have opted-in to call recording. The meeting minutes automatically captured and manually captured are automatically concatenated together in chronological order. As a result, meeting minutes for all participants may be captured but without violating requests for privacy and without violating data privacy regulations, such as the General Data Protection Regulation (GDPR) and/or other privacy requirements.

In one embodiment, a conferencing server is disclosed, comprising: a network interface to a network; a processor configured with instructions maintained in a non-transitory memory; and wherein the processor performs: receiving, via the network, a first audio input comprising audio from a consenting conference participant; receiving, via the network, a second audio input comprising audio from a non-consenting conference participant; broadcasting, via the network, the conference content, comprising the first audio input and the second audio input, to a number of communication devices corresponding to a number of conference participants and wherein the number of conference participants includes the consenting conference participant and the non-consenting conference participant; receiving a textual input from an input device selected from the number of communication devices; and providing the first audio input and the textual input and omit providing the second audio to a conference recording component.

In another embodiment, a method of conducting a conference over a network is disclosed, comprising: receiving a first audio input comprising audio from a consenting conference participant; receiving a second audio input comprising audio from a non-consenting conference participant; broadcasting the conference content, comprising the first audio input and the second audio input, to a number of communication devices corresponding to a number of conference participants and wherein the number of conference participants includes the consenting conference participant and the non-consenting conference participant; receiving a textual input from an input device selected from the number of communication devices; and providing the first audio input and the textual input and omit providing the second audio to a conference recording component.

In another embodiment, a system is disclosed, comprising: means to receive a first audio input comprising audio from a consenting conference participant; means to receive a second audio input comprising audio from a non-consenting conference participant; means to broadcast the conference content, comprising the first audio input and the second audio input, to a number of communication devices corresponding to a number of conference participants and wherein the number of conference participants includes the consenting conference participant and the non-consenting conference participant; means to receive a textual input from an input device selected from the number of communication devices; and means to provide the first audio input and the textual input and omit providing the second audio to a conference recording component.

A system on a chip (SoC) including any one or more of the above embodiments or features of the embodiments described herein.

One or more means for performing any one or more of the above embodiments or features of the embodiments described herein.

Any feature in combination with any one or more other features.

Any one or more of the features disclosed herein.

Any one or more of the features as substantially disclosed herein.

Any one or more of the features as substantially disclosed herein in combination with any one or more other features as substantially disclosed herein.

Any one of the features/embodiments in combination with any one or more other features/embodiments.

Use of any one or more of the embodiments or features as disclosed herein.

Any of the above embodiments or features, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Features of the present disclosure may take the form of an embodiment that is entirely hardware, an embodiment that is entirely software (including firmware, resident software, micro-code, etc.) or an embodiment combining software and hardware features that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some features of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual feature of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
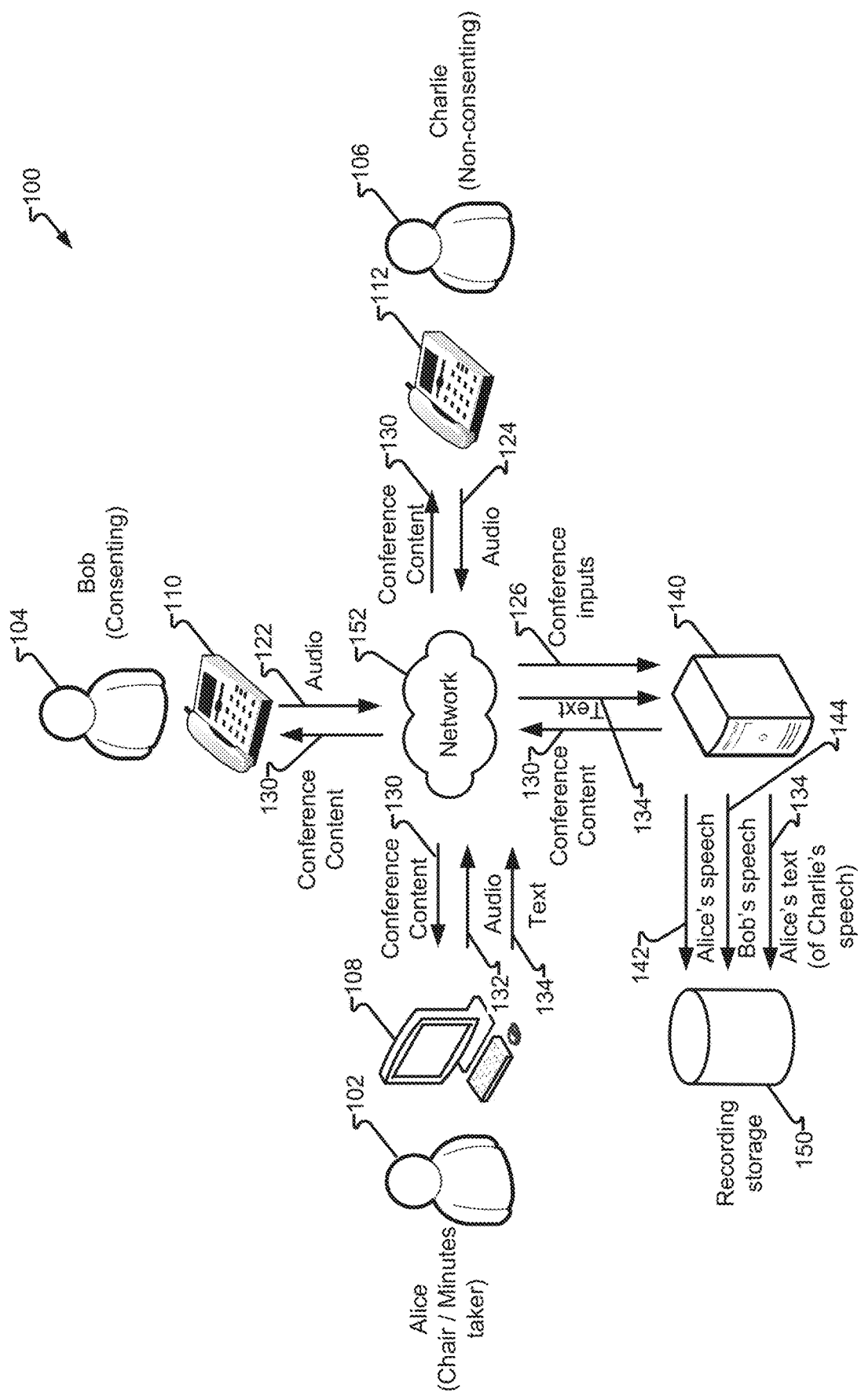
FIG. 1 depicts a system in accordance with embodiments of the present disclosure.

FIG. 1 depicts system 100 in accordance with embodiments of the present disclosure. In one embodiment, participant and meeting minutes taker 102, consenting participant 104, and non-consenting participant 106 are conducting for a remote conference over network 152 utilizing input device 108, communication device 110, and communication device 112 respectively. Participant and meeting minutes taker 102 is a designated meeting minutes (or, more simply, "minutes") taker for those participants that have either declined consent to being recorded or have not provided affirmative consent to being recorded, such as non-consenting participant 106. However, at least one participant (e.g., consenting participant 104) has consent to being recorded as too has participant and meeting minutes taker 102. It should be appreciated that, in other embodiments, that the conference may comprise any number of participants with at least one non-consenting participant and at least one consenting participant. Similarly, the communication devices utilized by participants in the conference may be variously embodied, such as telephones, soft phones, computers, etc., however, as will be described in more detail below, input device 108 utilized by participant and meeting minutes taker 102 comprises or utilizes hardware and/or software to capture and provide textual content, most commonly but not exclusively, a keyboard utilized to type into a graphical element generated by a conference client and presented on a display of input device 108.

Each participant will be prompted to provide consent to being recorded. The prompting and response may occur prior to each conference or as a configuration setting that, once set, applies to all subsequent conferences as a default setting. As a result, each participant may provide or withhold consent to being recorded. In another embodiment, a participant may have the option to not answer and, therefore, deemed to have not provided consent and treated as a participant that has withheld consent.

The conference may comprise a number of communication channels. For example, communication device 110 provides audio signals 122 to server 140 via network 152, communication device 112 provides audio signals 124 to server 140 via network 152 and input device 108 provides audio signals 132 to server 140 via network 152. Each conference device (e.g., input device 108, communication device 110, communication device 112) receives conference content 130 from server 140. The conference content comprise audio and optionally video, documents, etc., received by participant(s) of the conference. It should be appreciated that audio provided in conference content 130 may be omitted from the device used as the source of such audio, such as to avoid audio feedback.

Server 140 receives conference inputs 126 (e.g., audio signals 132, audio signals 122, audio signals 124) and/or optionally receives other conference input (e.g., video, documents, etc.) and broadcasts conference content 130 to network 152 and to each participant as conference content 130. Server 140 provides speech from consenting participants to recording component 150 for storing and any subsequent processing (e.g., translation, transcription, indexing, etc.), such as audio comprising speech 142 and audio comprising speech 144 received via conference inputs 126 as outputs audio signals 132 and audio signals 122, respectively. As with all received audio during the conference, audio signals 124 is received as a portion of conference inputs 126 and, in turn, broadcast as a portion of conference content 130 to network 152 and conference content 130 to each device. However, audio signals 124 as a portion of conference inputs 126 is not provided to recording component 150. As a result, speech provided by non-consenting participant 106 is excluded from recording component 150, but included in conference content 130. Speech provided by consenting participants (e.g., participant and meeting minutes taker 102 and consenting participant 104) is both provided as a portion of conference content 130 and provided to recording component 150 for recording.

Server 140 and recording component 150 may be discreet components or plurality of components. In other embodiments, server 140 and recording component 150 may be integrated into a single component. Additionally or alternatively, server 140 and/or recording component 150 may be integrated into a communication device, such as one of input device 108.

Having a non-consenting participant may leave a gap in the record of the meeting. While recording component 150 automatically records the audio (and optionally video, document images, etc.) for consenting participants no recording is made for the non-consenting participants. As a result, participant and meeting minutes taker 102 via input device 108 may capture textual content of the speech provided by non-consenting participant 106. Taking notes of some or all of what non-consenting participant 106 says is not considered to be a recording of the speech for purposes herein and, as a result, non-consenting participant 106 may have their speech manually transcribed with the resulting textual input 134 provided to server 140 and recording component 150.

In another embodiment, an automated transcription is provided to convert speech provided by non-consenting participant 106 into text without human input. The resulting text then provided to recording component 150 for storage in place of the speech provided. The automated transcription may be provided as an application executing on server 140, input device 108, and/or communication device 112. As a further option, automatically generated speech may be presented to a user, such as participant and meeting minutes taker 102 via input device 108 and/or non-consenting participant 106 via communication device 112, for approval and, if approved, stored by recording component 150. Additionally or alternatively, speech from non-consenting participant 106 may be received by participant and meeting minutes taker 102 and re-spoken by participant and meeting minutes taker 102 into input device 108. As a result, server 140 may receive "parroted" speech from participant and meeting minutes taker 102 that is omitted from conference content broadcast 128 but included for storage by recording component 150. As a result, recording component 150 may comprise only recorded speech but still omits any speech provided by non-consenting participant 106.

Figure 2:
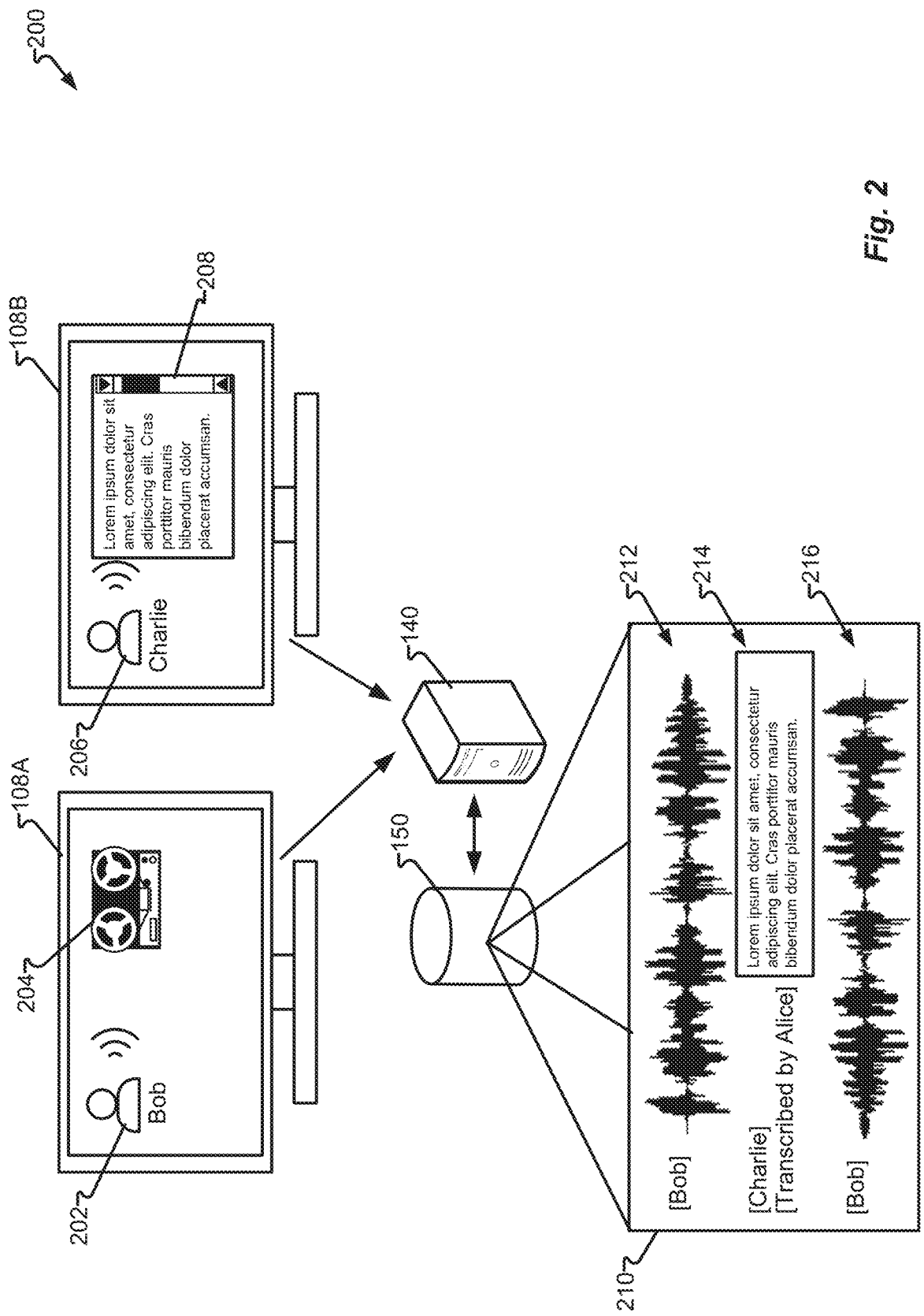
FIG. 2 depicts a system in accordance with embodiments of the present disclosure.

FIG. 2 depicts system 200 in accordance with embodiments of the present disclosure. In one embodiment, the number of conference participants is small, such as the three participants illustrated herein, and easily managed between consenting and non-consenting participants. However, a human minutes taker (e.g., participant and meeting minutes taker 102) may need to be prompted so that the human is aware that the current speaker in the conference is a non-consenting participant to ensure minutes are manually captured. This becomes more of an issue as the number of participants increases and mentally keeping track of who is, and who is not, being recorded becomes burdensome and error prone. For example, a human may readily distinguish who is talking when one of two other participants is speaking and mentally recall which participant they need to capture minutes for. However, this ability fails with a larger number of participants. For example, with five participants a human may spend so much time trying to determine if the current speaker is or is not a consenting participant, that they are unable to give actual minute-taking sufficient attention. With twenty or more, especially when the conference comprises rapid back-and-forth interactions between the participants, accurately determining who is speaking, whether manual minutes need to be captured, and capturing the minutes, becomes well beyond human ability. Even with a small number of participants, manual minute taking may be overlooked. For example, an engineer may by continually speaking for an extended time in order to pitch a project to a company executive. The executive may only provide short interjections (e.g., "yes," "no," "check with . . . ", "next quarter," etc.). A minutes-taker may become distracted and easily miss such a minor amount of speech, even if critically important. As a result, important minutes may be lost as participant and meeting minutes taker 102 fails to realize that a current speaker is a non-consenting speaker.

In one embodiment, input device 108 provides a graphical display comprising indicia 202 of the current speaker. In input device 108A, the current speaker ("Bob") is consenting participant 104 and indicia of recording 204 is provided to indicate that speech provided to the conference by consenting participant 104 is being recorded. Additionally or alternatively, input device 108A, while consenting participant 104 is speaking, receives signals from server 140 to indicate the speaker is a consenting speaker and, in response, input device 108 has a textual input element de-emphasized, removed, hidden, or disabled.

In another embodiment, such as at a later point in time during the conference, the current speaker changes, such as to non-consenting participant 106. Accordingly, input device 108B displays indicia 206 of the current speaker. Input device 108B is absent indicia of recording (e.g., indicia 204) as no recording of the speech provided by non-consenting participant 106 is being performed. Additionally or alternatively, input device 108B receives a signal indicating the current speaker is a non-consenting participant and, in response, input device 108 has textual input element emphasized, displayed, or enabled. In order to provide a visual indication that minutes need to (and optionally able to) be captured for the speech provided by non-consenting participant 106.

Alerting participant and meeting minutes taker 102, and input device 108, that a non-consenting speaker is currently talking may comprise reconfiguring input device 108 to be able to capture textual inputs to be provided to server 140 and maintained in recording component 150. Other alerts may be provided, such as an audible tone, haptic feedback, etc. In another embodiment, the placement of the indicia of the conference participants (e.g., indicia 202, indicia 206) may be moved or presented in an area of prominence on input device 108. For example, a portion of a graphical user interface presented on input device 108 may comprise a section that is occupied by an indicia for a current speaker when the current speaker is a non-consenting speaker. Additionally or alternatively, when a plurality of non-consenting speakers are present on the conference, an area of the display may be utilized for only non-consenting speakers and, when speaking, highlighted, emphasized, or relocated to an area of prominence.

Presenting an alert on input device 108 that a current speaker is a non-consenting participant may further comprise altering the audio to be different from the audio provided on input device 108 when a consenting participant is currently talking. For example, the audio may be louder and/or comprise a change in pitch. In order to provide additional time to capture meeting minutes, the audio provided by a non-consenting participant may be buffered and presented at a slower rate. Speech provided by a consenting speaker may be sped up in order to empty or build capacity in the buffer. The rate speech is presented may be determined manually, such as by participant and meeting minutes taker 102, and/or automatically such as the difference in the words per minute typed by participant and meeting minutes taker 102 and the words per minute spoken by non-consenting participant 106.

Server 140 may cause recording component 150 to store recording file 210 comprising the speech provided by consenting participants, such as in sound recording 212 and sound recording 216 and textual inputs 214 (e.g., text provided as textual input 134). Additionally or alternatively, metadata may be added, to recording file 210, such as identification of the current speaker, timestamp, etc., In another embodiment, textual input 134 is converted to generated speech and inserted into recording file 210 as a sound file (or portion of a sound recording). However, at no point does the speech provided by non-consenting participant 106 get recorded.

Figure 3:
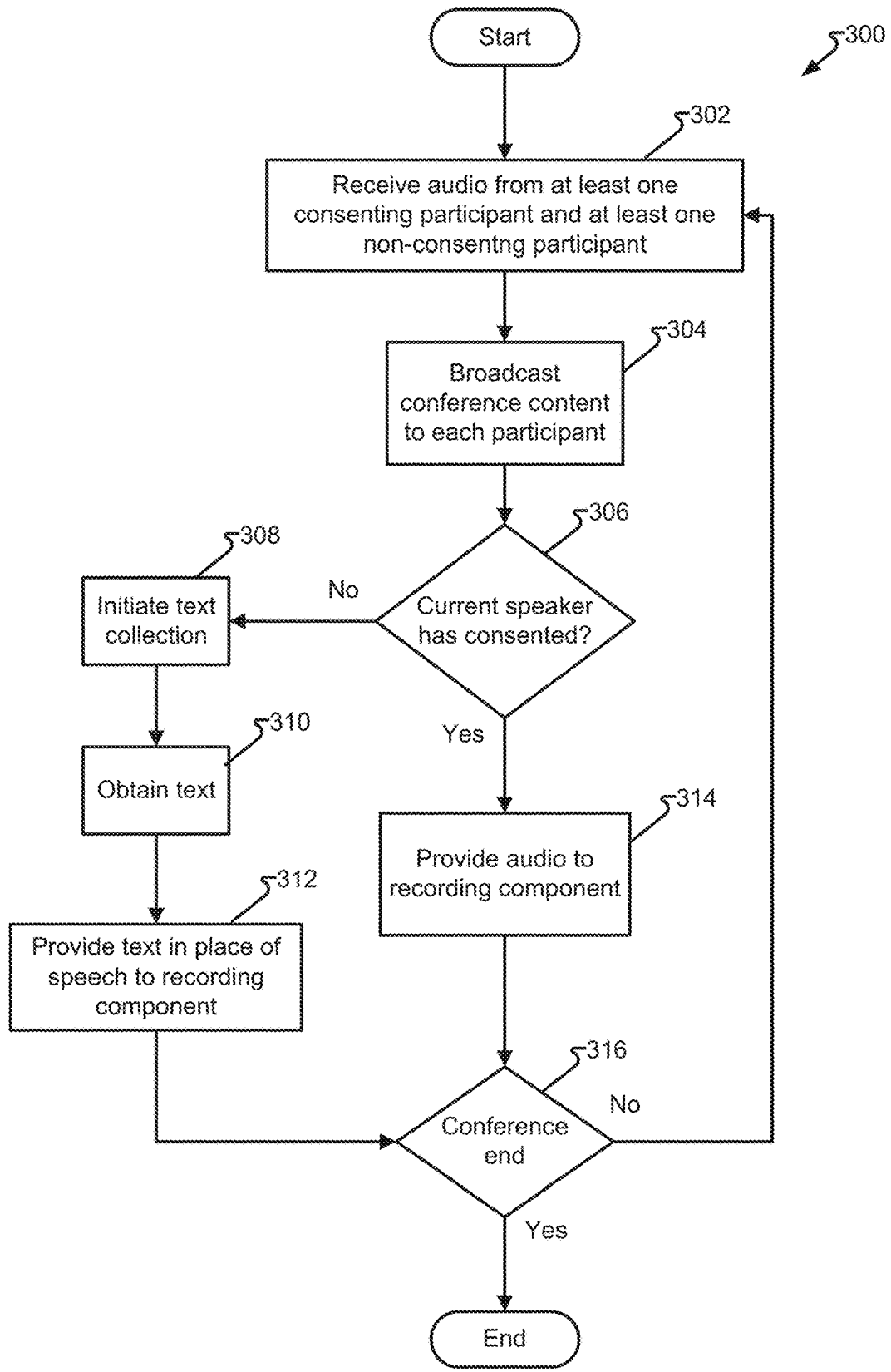
FIG. 3 depicts a process in accordance with embodiments of the present disclosure.

FIG. 3 depicts process 300 in accordance with embodiments of the present disclosure. In one embodiment, process 300 is embodied as machine-readable instructions that when read by a machine, such as a processor of server 140, cause the machine to perform the steps of process 300. In one embodiment, process 300 begins and in step 302 audio is received by at least one conference device associated with a consenting participant and at least one conference device associated with a non-consenting participant. It should be appreciated that receiving audio signals may include audio waveform signals without content and/or a signal indicating a connection between the respective device (e.g., input device 108, communication device 110, non-consenting participant 106) and server (e.g., server 140) but absent audio content when a particular participant is not speaking, muted, providing only non-speech (e.g., background) sounds, or otherwise able to provide speech to be encoded as the audio signals but presently not providing such speech. Accordingly, speech received in step 302 may comprise speech from one participant interspersed with another participant or participants.

The audio received from ones the participant(s), such as by consenting participant 104, is broadcasts to the participants in step 304. Test 306 determines if the current speaker has consented to being recorded. If test 306 is determined in the affirmative, step 314 provides the audio of the speaking participant to a recording component, such as recording component 150. If test 306 is determined in the negative, processing continues to step 308 which prompts the collection of textual data. Step 308 may issue an alert as an audible, textual, graphical, and/or haptic message, alter the audio presented, enable or emphasize a graphical element utilize to capture text, and/or alter the appearance or location of an indicia of the current speaker.

Step 310 obtains the text and provides the text in place of the speech provided by the current non-consenting speaker for recording in step 312. Test 316 determines if the conference has ended and, if determined in the affirmative, process 300 may end. If test 316 is determined in the affirmative, process 300 may continue such as by looping back to step 302. One of ordinary skill in the art will appreciate that step 300 may be embodied as a series of discrete steps, as illustrated, or as one or more parallel processes without departing from the scope of the embodiments provided.

Figure 4:
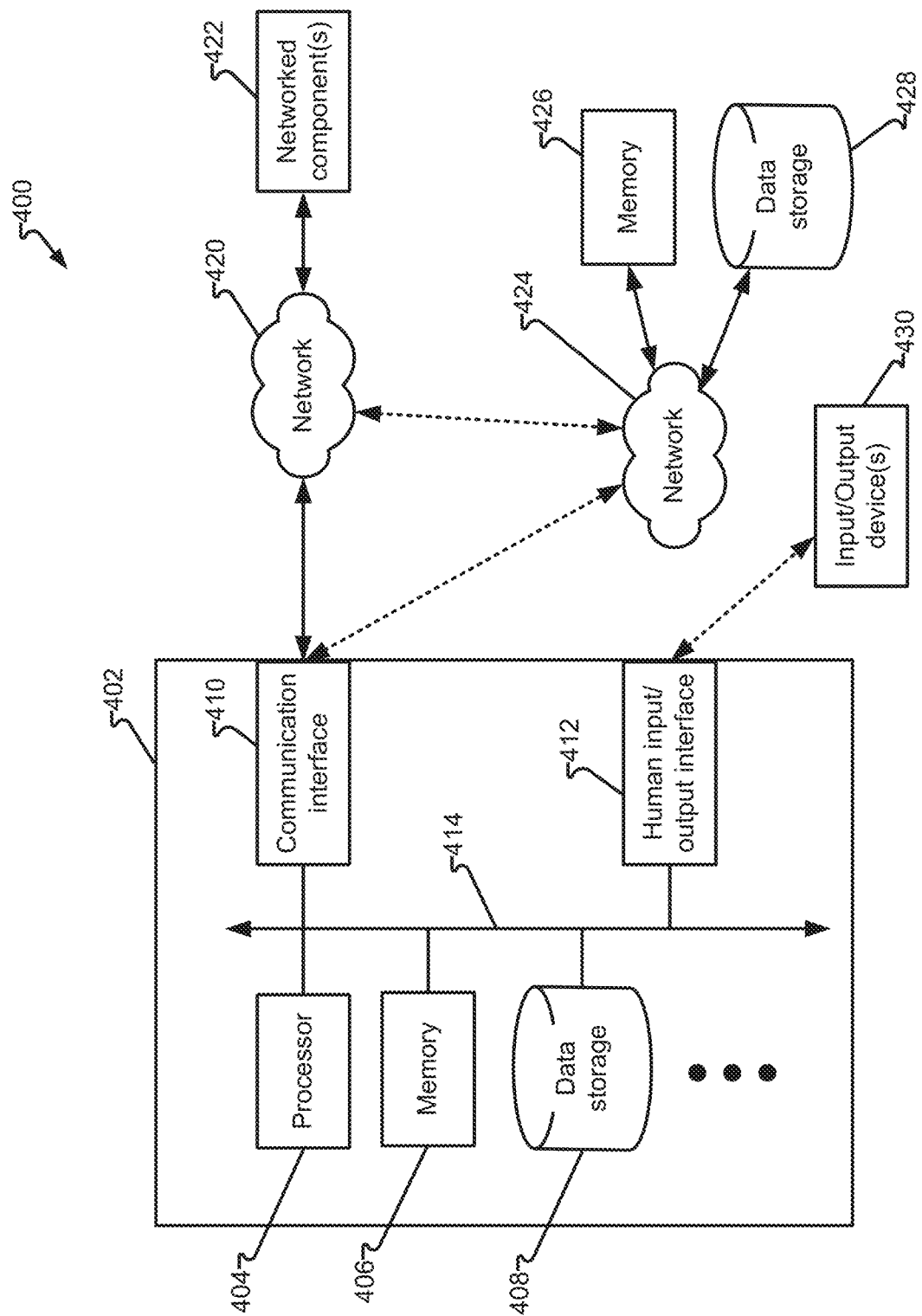
FIG. 4 depicts a system in accordance with embodiments of the present disclosure.

FIG. 4 depicts device 402 in system 400 in accordance with embodiments of the present disclosure. In one embodiment, server 140 may be embodied, in whole or in part, as device 402 comprising various components and connections to other components and/or systems. The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may comprise programmable logic functionality, such as determined, at least in part, from accessing machine-readable instructions maintained in a non-transitory data storage, which may be embodied as circuitry, on-chip read-only memory, memory 406, data storage 408, etc., that cause the processor 404 to perform the steps of the instructions. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414. In other embodiments, processor 404 may comprise a shared processing device that may be utilized by other processes and/or process owners, such as in a processing array within a system (e.g., blade, multiprocessor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or configured to utilize one or more networks, such as network 420 and/or network 424.

Network 152 may be embodied, in whole or in part, as network 420. Network 420 may be a wired network (e.g., Ethernet), wireless (e.g., WiFi, Bluetooth, cellular, etc.) network, or combination thereof and enable device 402 to communicate with networked component(s) 422. In other embodiments, network 420 may be embodied, in whole or in part, as a telephony network (e.g., public switched telephone network (PSTN), private branch exchange (PBX), cellular telephony network, etc.)

Additionally or alternatively, one or more other networks may be utilized. For example, network 424 may represent a second network, which may facilitate communication with components utilized by device 402. For example, network 424 may be an internal network to a business entity or other organization, whereby components are trusted (or at least more so) that networked components 422, which may be connected to network 420 comprising a public network (e.g., Internet) that may not be as trusted.

Components attached to network 424 may include memory 426, data storage 428, input/output device(s) 430, and/or other components that may be accessible to processor 404. For example, memory 426 and/or data storage 428 may supplement or supplant memory 406 and/or data storage 408 entirely or for a particular task or purpose. As another example, memory 426 and/or data storage 428 may be an external data repository (e.g., server farm, array, "cloud," etc.) and enable device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420. Each of memory 406, data storage 408, memory 426, data storage 428 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 430 may be a router, switch, port, or other communication component such that a particular output of processor 404 enables (or disables) input/output device 430, which may be associated with network 420 and/or network 424, to allow (or disallow) communications between two or more nodes on network 420 and/or network 424. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various features of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and features, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and features, includes providing devices and processes in the absence of items not depicted and/or described herein or in various embodiments, configurations, or features hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or features for the purpose of streamlining the disclosure. The features of the embodiments, configurations, or features of the invention may be combined in alternate embodiments, configurations, or features other than those discussed above. This method of disclosure is not to be interpreted as reflecting an intention that the claimed invention requires more features than are expressly recited in each claim. Rather, as the following claims reflect, inventive features lie in less than all features of a single foregoing disclosed embodiment, configuration, or feature. Thus, the following claims are hereby incorporated into this Detailed Description, with each claim standing on its own as a separate preferred embodiment of the invention.

Moreover, though the description of the invention has included description of one or more embodiments, configurations, or features and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or features to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A conferencing server, comprising:
a network interface to a network;
a processor configured with instructions maintained in a non-transitory memory; and
wherein the processor performs:
receiving, via the network, a first audio input comprising audio from a consenting conference participant;
receiving, via the network, a second audio input comprising audio from a non-consenting conference participant;
broadcasting, via the network, a conference content, comprising the first audio input and the second audio input, to a number of communication devices corresponding to a number of conference participants and wherein the number of conference participants includes the consenting conference participant and the non-consenting conference participant;
receiving a textual input from an input device selected from the number of communication devices; and
providing the first audio input and the textual input and omitting providing the second audio input to a conference recording component.

2. The conferencing server of claim 1, wherein the processor further performs, upon determining the second audio input comprises speech from the non-consenting conference participant, signaling the input device to initiate collection of the textual input.

3. The conferencing server of claim 1, wherein the processor further performs, upon determining the first audio input comprises speech from the consenting conference participant, signaling the input device to terminate collection of the textual input.

4. The conferencing server of claim 1, wherein:
receiving the first audio input comprises receiving the first audio input at a first time;
receiving the second audio input comprising receiving the second audio input at a second time; and
receiving the textual input comprises receiving the textual input at substantially the second time.

5. The conferencing server of claim 1, wherein providing the textual input further comprises generating speech from the textual input and providing the generated speech to the conference recording component.

6. The conferencing server of claim 1, wherein broadcasting the conference content further comprises broadcasting the conference content to the input device comprising at least one of an enhanced audio of the second audio input or a de-enhanced audio of the first audio input.

7. The conferencing server of claim 1, wherein broadcasting the conference content further comprises broadcasting the conference content to the input device comprising buffering the second audio input and broadcasting a slowed version of the second audio input maintained in the buffer to the input device.

8. The conferencing server of claim 7, wherein broadcasting the conference content further comprises broadcasting the conference content comprising buffering the first audio input and broadcasting an accelerated version of the first audio input maintained in the buffer to the input device.

9. The conferencing server of claim 1, wherein broadcasting the conference content to the input device comprising the second audio input comprises providing the input device with an alert at a start of the second audio input.

10. The conferencing server of claim 1, wherein the input device, in response to an alert, performs at least one of altering a tonal quality of the conference content, alters a volume of the conference content, plays an audio alert, presents a visual alert, activates a textual input component, or rearranges icons representing ones of the numbers of conference participants to place a speaking one of the number of conference participants in a prominent location on a display of the input device.

11. A method of conducting a conference over a network, comprising:

receiving a first audio input comprising audio from a consenting conference participant;

receiving a second audio input comprising audio from a non-consenting conference participant;

broadcasting conference content, comprising the first audio input and the second audio input, to a number of communication devices corresponding to a number of conference participants and wherein the number of conference participants includes the consenting conference participant and the non-consenting conference participant;

receiving a textual input from an input device selected from the number of communication devices; and providing the first audio input and the textual input and omitting providing the second audio input to a conference recording component.

12. The method of claim 11, further comprising, upon determining that the second audio input comprises speech from the non-consenting conference participant, signaling the input device to initiate collection of the textual input.

13. The method of claim 11, further comprising, upon determining that the first audio input comprises speech from the consenting conference participant, signaling the input device to terminate collection of the textual input.

14. The method of claim 11, wherein:
receiving the first audio input comprises receiving the first audio input at a first time;
receiving the second audio input comprises receiving the second audio input at a second time; and
receiving the textual input comprises receiving the textual input at substantially the second time.

15. The method of claim 11, wherein providing the textual input further comprises generating speech from the textual input and providing the generated speech to the conference recording component.

16. The method of claim 11, wherein broadcasting the conference content further comprises broadcasting the conference content to the input device comprising at least one of an enhanced audio of the second audio input or a de-enhanced audio of the first audio input.

17. The method of claim 11, wherein broadcasting the conference content further comprises broadcasting the conference content to the input device and buffering the second audio input and broadcasting a slowed version of the second audio input maintained in the buffer to the input device.

18. The method of claim 17, wherein:
broadcasting the conference content further comprises broadcasting the conference content comprising buffering the first audio input and broadcasting an accelerated version of the first audio input maintained in the buffer to the input device; and
broadcasting the conference content to the input device comprising the conference content comprising the second audio input further comprising an alert at a start of the second audio input.

* * * * *